United States Patent [19]
Troutman

[11] 4,406,704
[45] Sep. 27, 1983

[54] HIGH-SOLIDS SINGLE-PACKAGE AIR-DRYABLE PRIMER

[75] Inventor: Mark D. Troutman, Greensburg, Pa.

[73] Assignee: Westinghouse Electric Corp., Pittsburgh, Pa.

[21] Appl. No.: 369,721

[22] Filed: Apr. 16, 1982

[51] Int. Cl.³ .......................... C09D 3/64; G09D 5/08
[52] U.S. Cl. .................... 106/259; 106/14.05; 106/252; 106/253; 106/260; 106/263; 106/264; 523/172
[58] Field of Search ............... 106/252, 253, 259, 260, 106/262, 264, 263, 14.05, 14.22; 523/172; 524/601, 605

[56] References Cited

U.S. PATENT DOCUMENTS

| | | | |
|---|---|---|---|
| 2,877,130 | 3/1959 | Caron et al. | 106/263 |
| 3,260,609 | 7/1966 | Reeser | 106/163 |
| 3,474,057 | 10/1969 | De Vries | 523/172 |
| 4,025,476 | 5/1977 | Miller et al. | 523/172 |
| 4,031,048 | 6/1977 | Holmen et al. | 523/172 |
| 4,049,600 | 9/1977 | Patel | 523/459 |
| 4,094,837 | 6/1978 | Johnson | 106/14.24 |
| 4,105,808 | 8/1978 | McKenzie | 523/172 |
| 4,116,904 | 9/1978 | Verma | 106/253 |
| 4,220,567 | 9/1980 | Kindervater et al. | 524/601 |

Primary Examiner—Ronald W. Griffin
Attorney, Agent, or Firm—R. D. Fuerle

[57] ABSTRACT

Disclosed is a high solids single-package air-dryable primer containing about 15 to about 30% by weight air-dryable synthetic alkyd resin, about 10 to about 30% by weight organic solvents for the resin, at least about 0.4% by weight of a suspending agent, at least about 1 pbw of a polar additive for every pbw of the suspending agent, at least about 3% by weight of a coloring pigment, at least about 15% by weight of a corrosion inhibitor, at least about 0.3% by weight of a dryer, and about 30 to about 40% by weight of an extender pigment. The primer is prepared by mixing enough of the alkyd resin to wet the coloring pigment with enough of the solvent to optimize sheer. The suspending agent and polar additive are then added followed by the corrosion inhibitor and wetting agent. The coloring pigment is then added and the composition is ground to satisfactory particle size. Finally, the remaining ingredients are mixed in.

16 Claims, No Drawings

HIGH-SOLIDS SINGLE-PACKAGE AIR-DRYABLE PRIMER

BACKGROUND OF THE INVENTION

Because Environmental Protection Agency regulations now limit the amount of volatile organic compounds which can be emitted into the atmosphere, a need has arisen for paint products with reduced solvent content. It is difficult, however, to maintain the physical properties of a paint when very little solvent is present. In particular, the viscosity of low-solvent paints is higher, which makes application more difficult. When reactive diluents are substituted for solvent in the paint composition, the properties of the paint are altered. Also, previous paints used to dry quickly when the solvent evaporated, but when very little solvent is present it is difficult to produce a paint which will dry rapidly.

SUMMARY OF THE INVENTION

I have discovered a composition for a one-package air-dryable primer which retains the desirable physical properties of prior primers, yet meets the Environmental Protection Agency regulations on solvent emissions. The primer of this invention has a very fast drying time at ambient temperature, and a composition can be made which will be dry to the touch in less than 15 minutes at a thickness of 1.5 to 2.0 mils. Also, the primer has excellent corrosion inhibition, yet does not employ the more conventional, but hazardous, pigments of lead and chromate. Finally, the primer has a low enough viscosity when heated to permit application using air or airless spray equipment, and can be applied at the same viscosity and high solids as in its virgin, in can, state.

PRIOR ART

U.S. Pat. No. 4,220,567 discloses stabilizing pigmented lacquers which contain, among other ingredients pigments such as iron oxide red pigments (lines 50-55 of Col. 2), and air drying alkyd resins as a binder. In Example 2 the ratio of pigment to binder is about 6 to 1.

U.S. Pat. No. 4,116,904 discloses a water based primer which includes a binder of an alkyd resin which is the esterification product of drying oil fatty acids and pigments which can be red iron oxide. The ratio of pigment to binder is as high as 300 to 100, and the primer coating dries at room temperature.

U.S. Pat. Nos. 3,474,057 and 4,094,837 disclose high pigment to binder ratios in priming compositions and drying at room temperature.

U.S. Pat. No. 4,049,600 discloses an alkyd containing paint primer.

DESCRIPTION OF THE INVENTION

The primer of this invention is a complex mixture of many different ingredients. The first ingredient is an air-dryable synthetic alkyd resin. An air-dryable resin is a resin which cures completely in air at ambient temperatures. Suitable air-dryable synthetic alkyd resins include soya oil alkyd, chain-stopped silicon modified alkyd, vinyl toluenated alkyd, copolymer alkyd, chain-stopped medium oil alkyd, and chain-stopped short tall oil alkyd. A chain-stopped short tall oil alkyd resin is preferred as it has the fastest drying time. The air-dryable synthetic alkyd resin should constitute at least about 15% (all percentages herein are by weight) of the primer because if less is used, the pigment may not be wetted. The air-dryable synthetic alkyd resin should not constitute more than about 30% of the primer, however, as the primer is then viscous and difficult to work with. A preferred range is about 16 to about 20%.

The primer also includes about 10 to about 30% of an organic solvent. If less than about 10% is used, it becomes difficult to apply the primer to substrates, and if more than about 30% is used, the primer is no longer a high solids primer. The amount of solvent should preferably be between about 15 and about 20% as less makes the primer difficult to apply, and if more than 20% is used, the primer may not meet Environmental Protection Agency requirements for solvent emission. Suitable solvents include ketones, alcohols, esters, glycol ethers, and aromatic hydrocarbons. Aromatic hydrocarbons include compounds such as toluol, xylol, solvesso 100, and solvesso 150. Aromatic hydrocarbons are the preferred solvents because they are inexpensive and evaporate at a rate which is neither too fast nor too slow. The preferred aromatic hydrocarbons are toluol and xylol because the solids used in the primer are highly soluble in them and separations do not occur in the primer.

A suspending agent, which prevents these solids from agglomerating during settling, is also included in the primer. Suspending agents are proprietary materials which are typically organophillic clays. The amount of suspending agent should be between about 0.4 and about 0.8% as less is not effective and more, while it is not harmful, produces no additional benefit.

A polar additive is included in the primer to increase the effectiveness of the suspending agent by forcing the suspended particles apart. Polar additives are typically lower alkyl alcohols or propylene carbonates. Methanol is the preferred polar additive as it works well and is inexpensive. About one part by weight of polar additive should be used to every 2 to 4 parts by weight of suspending agent as less is below optimum and more is not harmful, but produces no additional benefit. The preferred amount of polar additive is about one part by weight for every 3 parts by weight of suspending agent.

A wetting agent is not required in the primer but it is preferably present as it aids in the disbursement of the pigments. Wetting agents are surfactants such as the lecithins. The preferred wetting agent is soya lecithin as it works very effectively in this primer. More than about 0.5% wetting agent will not be harmful but it will not produce any additional benefit. The preferred amount of wetting agent is about 0.2 to about 0.4%.

A coloring pigment must be included in the primer to hide the substrate. Coloring pigments are non-soluble coloring agents of any color, but, as different pigments have different oil absorption characteristics, it may be necessary to adjust the concentrations of the other components in the primer if coloring pigments of different oil absorptions are used. Suitable coloring pigments include iron oxide, titanium dioxide, phthallo blue, phthallo green, and carbon black. The preferred coloring pigment is iron oxide as it is the standard in the industry. The amount of coloring pigment should be about 3 to about 8% as less does not hide the substrate well and more is unnecessary and wasteful. THe preferred percentage is about 5 to about 7%.

The primer should contain a corrosion inhibitor to prevent the corrosion of the substrate if the substrate is susceptible to corrosion. Suitable corrosion inhibitors include red lead, zinc chromate, strontium chromate, and calcium borosilicate. Calcium borosilicate is preferred as it is non-hazardous. At least about 15% of the primer should be corrosion inhibitor as less is ineffective, but more than 20% should not be used as it is wasted and may actually increase the amount of corrosion. The preferred amount of corrosion inhibitor is about 17 to about 19%.

A dryer is included in the primer to aid in drying when the primer is exposed to air. The preferred dryer is a mixture of a potassium octoate and cobalt salts of mixed aliphatic acids. Other dryers, which are usually proprietary materials, may also be used. The amount of dryer should be at least about 0.3% as less is ineffective but it should not exceed about 1% as, while it is not harmful, it is wasted because it has no additional beneficial effect. The preferred amount of dryer is about 0.5 to about 0.7%.

While not required, up to about 0.4% of an anti-skinning agent is preferably present in the primer to aid in the prevention of a skin on the surface of the primer. More than about 0.4% of anti-skinning agent is unnecessary and wasteful, and the preferred percentage is about 0.1 to about 0.3%. Anti-skinning agents are also proprietary materials, but the preferred anti-skinning agent is methyl ethyl ketoxime.

An extender pigment is included in the primer to reduce the amount of coloring pigment because coloring pigments are usually much more expensive than extender pigments. Extender pigments also add solids to the primer and lower the gloss. Also, unlike coloring pigments, extender pigments absorb less oil and so more extender pigment can be added with less reduction in the viscosity of the primer. Suitable extender pigments include calcium carbonate and magnesium silicate. The preferred extender pigment is a mixture of calcium carbonate and magnesium silicate. About 30 to about 40% of the primer should be extender pigment as less tends to lengthen the drying time and more will make the viscosity of the primer too high. The preferred percentage is about 33 to about 37%.

It is highly desirable that the primer be prepared by mixing the ingredients in a particular sequence as this reduces the amount of work required to produce the primer and results in a better and more homogeneous product. The sequence consists of two phases—a dispersion phase and a letdown phase. In the dispersion phase only enough of the alkyd resin is used to wet pigment that must be ground. Generally speaking, all of the coloring pigment is of such a large particle size that is must be ground and the extender pigment may or may not require grinding. The amount of solvent used in this dispersion phase should be sufficient for optimum sheer to reduce the grinding time. That is, if an insufficient amount of solvent is present at this phase, the composition will be too viscous to grind easily and if too much solvent is present, the pigments will not be sheered well during grinding. To produce a better thixotropy, the suspending agent, the polar additive, and the solvent are first dispersed into the resin. Then the wetting agent, the corrosion inhibitors, and the pigments which must be ground are added. The composition is then ground until the particle size of the solids is reduced to a satisfactory level. Generally, it is desirable that the particle size be greater than 5 on a Heman gauge. In the letdown phase the remaining solvent, resin, and other ingredients are added and the primer is mixed until it is homogeneous.

The primer is then stored in airtight containers until it is ready for use. It can be applied to plastics, metals such as copper, aluminum, and ferrous metals, or other types of substrates. Generally speaking, however, the primer is intended for application on various metals. The primer can be applied by spraying, brushing, or rolling. It is usually too viscous for application by dipping or flow-coating. Spray-coating, whether air spray or airless spray, works best when the primer is heated to about 160° to 180° F. After application, the primer dries to a hard coating within a few minutes.

The following examples further illustrate this invention.

EXAMPLE

A primer according to this invention was prepared in two portions—a grind portion and a letdown portion. The composition of the grind portion was as follows:

| | |
|---|---|
| Conjugated tall oil with an isophthalic chain-stopped alkyd resin sold by Cargill as "5707" | 224 pounds |
| Toluol | 150 pounds |
| Organic derivative of a special montmorillinite clay sold by National Lead as "Bentone 14" | 6 pounds |
| Methanol | 2 pounds |
| Soya Lecithin (wetting agent) | 5 pounds |
| Red Iron Oxie #2899 | 100 pounds |
| Calcium borosilicate composite pigment sold by Halox Corp. as "CW-291" (corrosion inhibitor) | 300 pounds |

The composition of the letdown portion was as follows:

| | |
|---|---|
| Cargill 5707 | 75 pounds |
| 12% solution of cobalt salts of aliphatic acids in mineral spirits sold by Tenneco Chemicals (dryer) | 6 pounds |
| Potassium octoate sold by Mooney Chemicals (dryer) | 4 pounds |
| Methyl ethyl ketoxime sold by Tenneco Chemicals as "Ex-Kin #2" (anti-skinning agent) | 3 pounds |
| Calcium carbonate sold by R. E. Carrol Inc. as "Snowflake" (extender pigment) | 512 pounds |
| Magnesium silicate sold by Whittaker, Clark & Daniels, Inc. as "107 Talc" (extender pigment) | 54 pounds |
| Xylol | 180 pounds |

The Bentone 14 was pre-mixed with the Cargill 5707, toluol, and methanol in the grind portion before the soya lecithin was added. After adding the soya lecithin, the red iron oxide and the Halox CW-291 were added. The soya lecithin must be added before the pigments to insure proper wetting during dispersion. The ground paste can then be added to the pre-mixed letdown portion with agitation, or each ingredient of the letdown portion can be added to the ground paste in order with agitation.

The primer had the following physical properties as applied:
Viscosity = 72 Krebbs units
Weight Solids = 75.6%
Volume Solids = 55.6%
Pounds of Volatile Organic Compound per gallon = 3.22

Weight per gallon = 13.2 pounds

The primer was heated to 170° F. and was airless-sprayed at a pressure of 50 to 60 psi onto a steel substrate. After 5 to 10 minutes at 77° F. the coating was dry to the touch. The thickness of the film was 1½ to 2 mils.

I claim:

1. A high solids single-package air-dryable primer comprising:
   (1) about 15 to about 30% by weight air-dryable synthetic alkyd resin;
   (2) about 10 to about 30% by weight organic solvent for said resin;
   (3) at least about 0.4% by weight suspending agent;
   (4) at least 1 pbw polar additive for every 3 pbw of said suspending agent;
   (5) about 3% to about 8% by weight coloring pigment;
   (6) about 15% to about 20% by weight corrosion inhibitor;
   (7) at least about 0.3% by weight dryer; and
   (8) about 30 to about 40% by weight extender pigment.

2. A primer according to claim 1 wherein said alkyd resin is a chain-stopped short tall oil alkyd resin.

3. A primer according to claim 1 wherein said solvent is selected from the group consisting of toluol, xylol, and mixtures thereof.

4. A primer according to claim 1 wherein said suspending agent is an organophilic clay.

5. A primer according to claim 1 wherein said polar additive is methanol.

6. A primer according to claim 1 which includes up to about 0.5% by weight of a wetting agent.

7. A primer according to claim 6 wherein said wetting agent is lecithin.

8. A primer according to claim 1 wherein said coloring pigment is iron oxide.

9. A primer according to claim 1 wherein said corrosion inhibitor is calcium borosilicate.

10. A primer according to claim 1 wherein said dryer is selected from the group consisting of potassium octoate, cobalt salts of mixed aliphatic acids, and mixtures thereof.

11. A primer according to claim 1 which includes up to about 0.4% by weight of an anti-skinning agent.

12. A primer according to claim 11 wherein said anti-skinning agent is methyl ethyl ketoxime.

13. A primer according to claim 1 wherein said extender pigment is a mixture of calcium carbonate and magnesium silicate.

14. A primer according to claim 1 wherein said primer is prepared by:
   (1) mixing enough of said alkyd resin to wet said coloring pigment with enough of said solvent to optimize sheer;
   (2) mixing in said suspending agent and said polar additive;
   (3) mixing in said corrosion inhibitor and said wetting agent;
   (4) mixing in and grinding all of said coloring pigment to a satisfactory particle size; and
   (5) mixing in the remaining ingredients.

15. A substrate coated with a composition according to claim 1 and exposed to air.

16. A high solids single-package air-dryable primer comprising
   (1) about 16 to about 20% by weight air-dryable synthetic alkyd resin;
   (2) about 15 to about 20% by weight organic solvent for said alkyd resin;
   (3) about 0.4 to about 0.8% by weight suspending agent;
   (4) about 0.25 to about 0.5 pbw polar additive per pbw of said suspending agent;
   (5) about 0.2 to about 0.4% by weight wetting agent;
   (6) about 5 to about 7% by weight coloring pigment;
   (7) about 17 to about 19% by weight corrosion inhibitor;
   (8) about 0.5 to about 0.7% by weight dryer;
   (9) about 0.1 to about 0.3% by weight anti-skinning agent; and
   (10) about 33 to about 35% by weight extender pigment.

* * * * *